United States Patent
Yankevich et al.

(10) Patent No.: US 10,568,160 B2
(45) Date of Patent: Feb. 18, 2020

(54) AGGREGATION MECHANISM FOR MOVING VEHICLES

(71) Applicant: Cisco Technology, Inc., San Jose, CA (US)

(72) Inventors: Evgeny Yankevich, Beachwood, OH (US); Paul Stager, Akron, OH (US); Matt Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/015,296

(22) Filed: Jun. 22, 2018

(65) Prior Publication Data
US 2018/0302939 A1    Oct. 18, 2018

Related U.S. Application Data

(63) Continuation of application No. 14/629,511, filed on Feb. 24, 2015, now abandoned.

(51) Int. Cl.
| | |
|---|---|
| *H04W 76/15* | (2018.01) |
| *H04W 4/02* | (2018.01) |
| *H04W 28/06* | (2009.01) |
| *H04L 27/26* | (2006.01) |
| *H04L 25/02* | (2006.01) |
| *H04L 1/00* | (2006.01) |

(52) U.S. Cl.
CPC .......... *H04W 76/15* (2018.02); *H04L 1/0007* (2013.01); *H04L 25/0222* (2013.01); *H04L 27/2602* (2013.01); *H04L 27/2646* (2013.01); *H04W 4/023* (2013.01); *H04W 28/06* (2013.01); *H04W 4/027* (2013.01)

(58) Field of Classification Search
None
See application file for complete search history.

(56) References Cited

U.S. PATENT DOCUMENTS

| | | | |
|---|---|---|---|
| 5,597,136 A * | 1/1997 | Wilke | F41G 7/2246 244/3.15 |
| 6,795,686 B2 | 9/2004 | Master et al. | |
| 7,359,771 B2 | 4/2008 | Soulie et al. | |
| 7,474,676 B2 * | 1/2009 | Tao | H04L 1/1628 370/469 |
| 7,701,975 B1 * | 4/2010 | Tsang | H04L 1/0079 370/252 |

(Continued)

OTHER PUBLICATIONS

Salim, Kalifa Abboud, Channel Prediction Based Adaptive Packet Length for Wireless Communications, Int'l Journal of Advanced Computer Technology (6 pages) can be found at: http://jact.org/volume3issue1/IJ0310038.pdf.

(Continued)

*Primary Examiner* — James P Duffy (57) ABSTRACT

In one embodiment, a method implemented on an access point of a wireless communication system includes: determining an estimate for a relative velocity between a mobile wireless client device and the access point, the mobile wireless client device communicating wirelessly with the access point over a channel; determining a channel coherence time for the channel using said estimated relative velocity; and determining a maximum aggregated frame size based on the determined channel coherence time.

20 Claims, 3 Drawing Sheets

(56) References Cited

U.S. PATENT DOCUMENTS

| | | | |
|---|---|---|---|
| 8,457,546 B2 | 6/2013 | Mahajan et al. | |
| 8,559,887 B2 | 10/2013 | Stager et al. | |
| 2008/0042898 A1* | 2/2008 | Sharma | G01S 5/0284 |
| | | | 342/450 |
| 2009/0247186 A1* | 10/2009 | Ji | G01S 5/02 |
| | | | 455/456.1 |
| 2009/0262692 A1 | 10/2009 | Olszewski | |
| 2010/0131751 A1* | 5/2010 | Reznik | H04L 63/16 |
| | | | 713/151 |
| 2011/0019557 A1 | 1/2011 | Hassan et al. | |
| 2011/0026623 A1* | 2/2011 | Srinivasa | H04L 1/0016 |
| | | | 375/260 |
| 2011/0217934 A1* | 9/2011 | Oga | H04B 7/01 |
| | | | 455/62 |
| 2012/0170565 A1* | 7/2012 | Seok | H04L 27/2602 |
| | | | 370/338 |
| 2013/0177115 A1* | 7/2013 | Yang | H04B 7/01 |
| | | | 375/347 |
| 2015/0078291 A1 | 3/2015 | Güner | |
| 2016/0249398 A1 | 8/2016 | Yankevich et al. | |

OTHER PUBLICATIONS

IEEE 802.11n-2009, Published Oct. 29, 2009.

\* cited by examiner

AGGREGATION MECHANISM FOR MOVING VEHICLES

CROSS-REFERENCE TO RELATED APPLICATIONS

This application is a continuation of U.S. application Ser. No. 14/629,511, filed Feb. 24, 2015, the entirety of which is incorporated herein by reference.

TECHNICAL FIELD

The present disclosure generally relates to methods and apparatus to estimate a channel coherence time and a maximum aggregation frame size in wireless communication systems.

BACKGROUND

Channel coherence time describes the time duration during which characteristics of a wireless channel do not vary. Knowledge of the channel coherence time or the detection of a sudden change in the channel state may be used to improve the efficiency of several functions in a wireless system. Indeed, the length of the aggregated packets is usually less than the channel coherence time to ensure that data are successfully exchanged (transmitted and/or received) between wireless client devices and access points.

Mobility of the wireless client devices is another factor which reduces the channel coherence time. Therefore, when a wireless client device is mobile relative to the access points, a minimal packet aggregation length suitable for all velocities, or no aggregation at all, is used to ensure proper/successful data exchanges.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

In one embodiment, a method implemented on an access point of a wireless communication system includes: determining an estimate for a relative velocity between a mobile wireless client device and the said access point, the mobile wireless client device communicating wirelessly with the access point over a channel; determining a channel coherence time for the channel using the estimated relative velocity; and determining a maximum aggregated frame size based on the determined channel coherence time.

DETAILED DESCRIPTION OF EXAMPLE EMBODIMENTS

Figure 1:
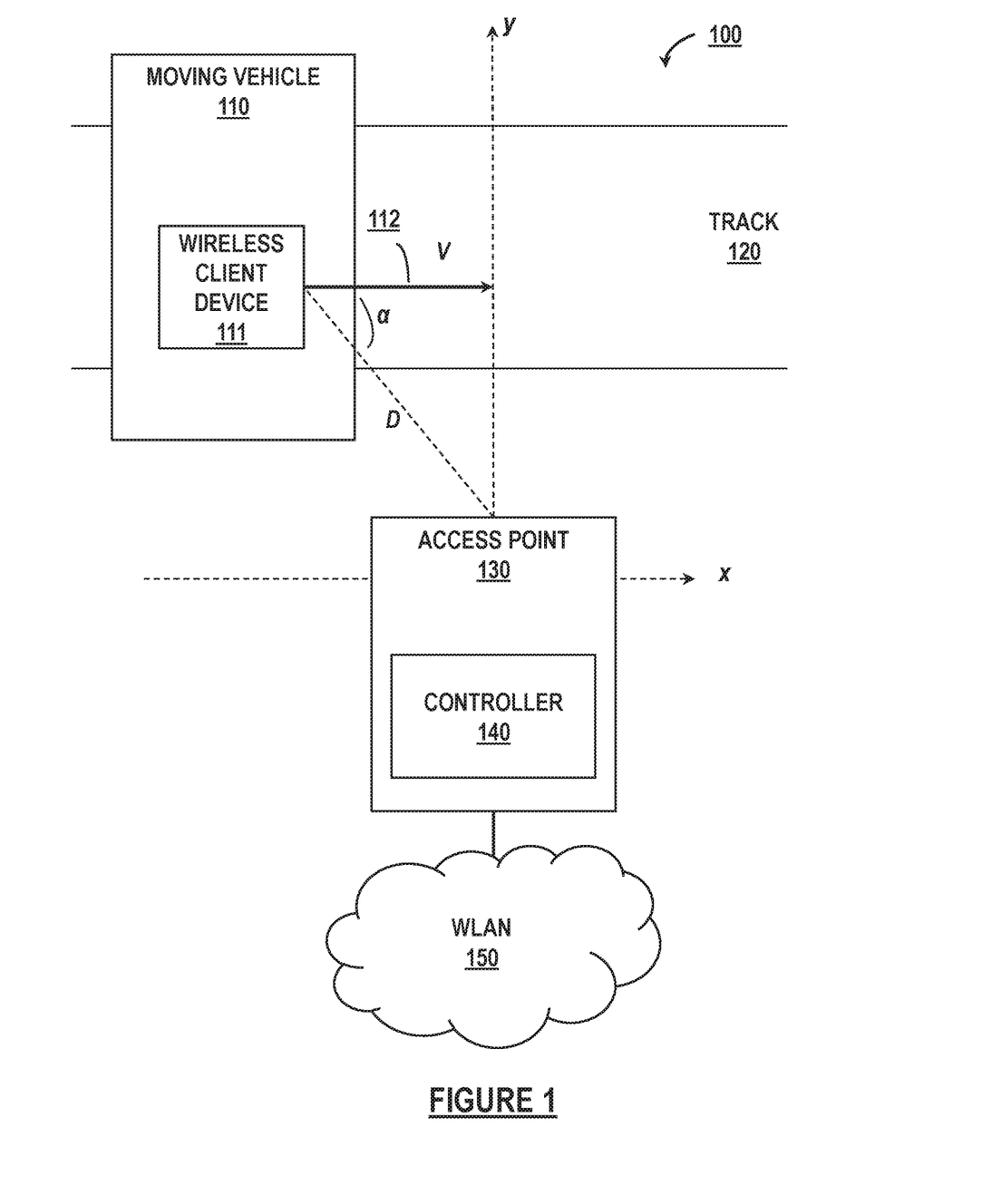
FIG. 1 is a simplified block diagram illustration of a wireless client device and an access point of a wireless communication network, constructed and operative in accordance with an embodiment of the present invention.

Reference is now made to FIG. 1, which shows a wireless communication system or network constructed and operative in accordance with an embodiment of the present invention. The wireless communication network 100 comprises a moving vehicle 110 such as, but not limited to, a train moving along a track 120. Wireless local area network access points (APs) are deployed along the path of the track 120 to provide network connectivity to end users located in the moving vehicle 110. For the sake of simplicity of depiction, only one AP 130 is shown in FIG. 1 although those skilled in the art will appreciate that a plurality of APs 130 are typically provided at regular intervals along the path of the track 120. The AP 130 is connected to a wired local area network (WLAN) and is operable to communicate wirelessly over channels with one or more wireless client devices 111 located in the moving vehicle 110.

The wireless client device 111 may be any type of electronic device having wireless connectivity such as, but not limited to, a laptop computer, a tablet computer, a smartphone, a mobile computing device or any other handheld device. Alternatively and/or additionally, the wireless client device 111 may be a workgroup bridge (WGB) device which operates as a mobile wireless client device with respect to the trackside AP 130. In such a situation, the WGB device is connected to a switch to serve client devices inside the moving vehicle 110 which do not have wireless network connectivity.

The AP 130 and the one or more wireless client devices 111 comprises one or more antennas for communicating over channels using a wireless communication protocol, such as an IEEE 802.11 wireless communication protocol. IEEE 802.11 technology is evolving from 802.11a/b/g to 802.11n/ac in order to meet the high-throughput demand of different wireless client devices. To achieve high throughput between an access point and a wireless client device, IEEE 802.11n introduced two frame aggregation schemes. One of these schemes, known as A-MPDU (aggregate Medium Access Control Protocol Data Unit), amortizes the physical (PHY) protocol overhead over multiple frames by packing several MPDUs into a single A-MPDU. IEEE 802.11ac uses the same frame aggregation scheme but extends the maximum frame size. Also, all the frames transmitted use the A-MPDU scheme. The maximum frame size of a PPDU (Physical layer conversion Protocol Data Unit typically comprising a PHY header, a preamble and an A-MPDU) is further dependent on the channel coherence time for the IEEE 802.11n and ac wireless networking standards.

The channel coherence time may be defined as the time interval during which the wireless channel parameters do not vary, or vary by an insignificant amount. For moving vehicles, such as the moving vehicle 110, the parameters of the channel are defined by the Doppler frequency spread which is a function of the relative velocity between the wireless client device 111 and the AP 130.

FIG. 1 shows a moving vehicle 110 moving in the direction of arrow 112 associated with the wireless client device 111. In such a configuration, the Doppler frequency shift ($F_D$) of the transmission due to the movement of the wireless client device 111 relative to the AP 130 may be approximated by the following equation:

$$F_D = \frac{V}{\lambda_C} \cdot \cos\alpha = \frac{V \cdot F_C}{c} \cdot \cos\alpha$$

where:
V denotes the instant velocity of the moving vehicle 110;
c denotes the propagation speed of light in vacuum;

$\lambda_C$ denotes the wavelength of the carrier frequency;
α denotes the angle between the vector of movement (i.e. arrow 112) and the AP 130; and
$F_C$ denotes the carrier frequency.

Hence, the Doppler frequency shift reaches its maximum for α angle values of 0 and 180 degrees. Also, the Doppler frequency shift reaches its minimum for an α angle value of 90 degrees. For a wireless client device 111 moving at a velocity of 200 mph and a carrier frequency of 6 GHz, the approximate maximal Doppler shift value would be 1.78 KHz. In the worst case scenario in which the transmission reflects from another moving vehicle coming in the opposite direction, the maximal Doppler shift value will double to 3.55 KHz. Although there is no specific definition for the channel coherence time ($T_C$), it is known to be inversely proportional to the maximum Doppler frequency spread ($F_{D_{MAX}}$):

$$T_C \approx \frac{1}{F_{D_{MAX}}}$$

To achieve a proper and successful transmission/reception, the duration of the PPDU is typically less than the channel coherence time. Therefore, the channel coherence time (and consequently the maximum frame size of the PPDU) is dependent on the position and velocity of the wireless client device 111 relative to the AP 130. In order to ensure an optimal quality of service, the AP 130 comprises a controller 140 which is configured to provide estimates of the maximum frame size of the PPDU as well as the maximum frame size of the A-MPDU. The AP 130 is then operable to use these estimates to dynamically aggregate packets that are to be transmitted to the wireless client device 111 over the channel.

Figure 2:
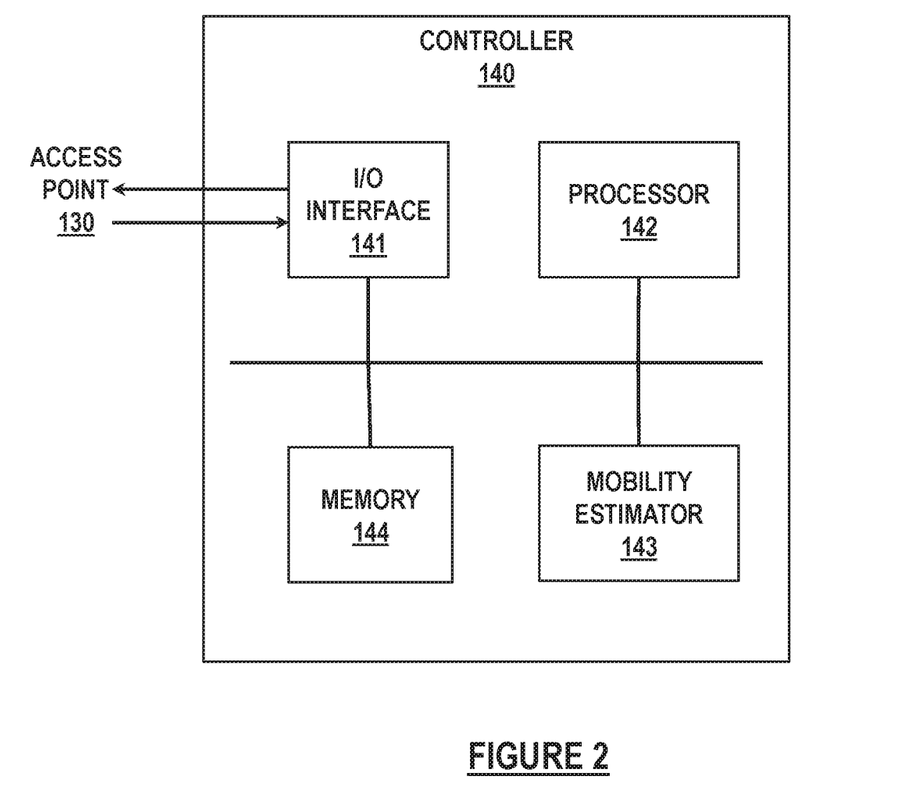
FIG. 2 is a simplified block diagram illustration of an access point controller, constructed and operative in accordance with an embodiment of the present invention.

Reference is now made to FIG. 2, which is a simplified block diagram illustration of a controller constructed and operative in accordance with an embodiment of the present invention. The controller 140 typically comprises an input/output (I/O) communication interface 141, a processor 142, a mobility estimator 143 and a memory 144.

The I/O communication interface 141 may be any suitable communication interface providing a two-way coupling enabling the AP 130 and the controller 140 to exchange data. The I/O communication interface 141 is further operable to pass data received from the AP 130 to the processor 142, the mobility estimator 143 or to the memory 144 for later use.

The processor 142 is a microcontroller or a microprocessor, for example, configured to execute software instructions stored in memory 144.

The mobility estimator component 143 may include a filter, such as for example, but not limited to, a Kalman filter which is configured to provide estimates of different parameters relevant to the wireless client device 111 based at least on a received signal strength indication (RSSI). Non-limiting examples of these parameters include, but are not limited to: instant velocity of the wireless client device 111; distance between the wireless client device 111 and the AP 130; angle between the vector of movement (i.e. arrow 112) associated with the wireless client device 111 and the AP 130; and coordinates of the wireless client device 111 in the coordinate system of the AP 130. These estimates may then be passed to the processor 142 for immediate processing and/or stored in memory 144 to be processed at a later time.

The memory 144 may comprise read only memory (ROM), random access memory (RAM), magnetic disk storage media devices, optical storage media devices, flash memory devices, electrical, optical, or other physical/tangible (e.g. non-transitory) memory storage devices. Thus, in general, memory 144 may comprise one or more computer readable storage media (e.g. memory device) encoded with software comprising computer executable instructions and when the software is executed (by the processor 142) it is operable to perform the operations described hereinbelow. For example, memory 144 stores or is encoded with instructions for:

determining a relative velocity between the wireless client device 111 and the AP 130;
determining a channel coherence time;
determining a maximum frame size of the PPDU and/or the A-MPDU; and
controlling the packet aggregation process.

The memory 144 is further operable to store information/data including, but not limited to, AP neighbor lists and neighbor tables, aggregation length tables, regulatory domain channel definitions, Dynamic Frequency Selection (DFS) channel definitions, MAC addresses, Internet Protocol (IP) addresses, Modulation and Coding Schemes (MCS) index values, etc.

Figure 3:
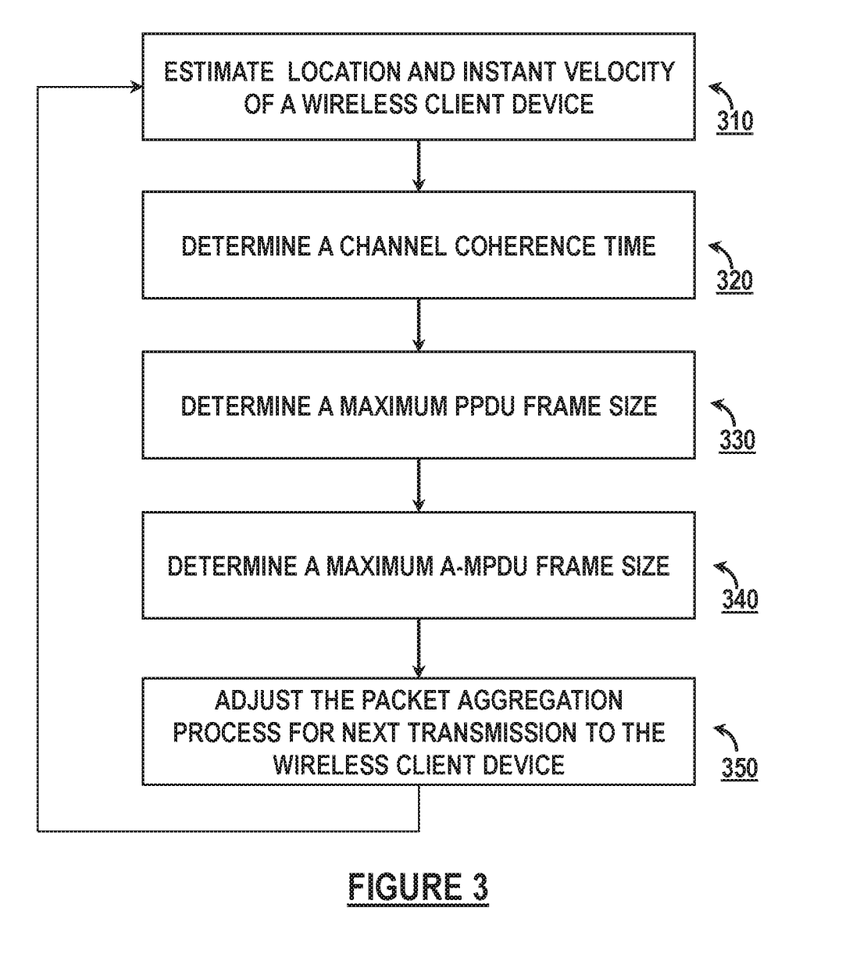
FIG. 3 is a simplified flow chart diagram of a method for determining a maximum aggregate frame size in accordance with embodiments of the present invention.

Reference is now made to FIG. 3, which is a flow chart diagram of a method for estimating an A-MPDU frame size operative in accordance with an embodiment of the present invention.

The process starts at step 310 where the mobility estimator 143 provides estimates of different parameters relevant to the wireless client device 111 based at least on a received signal strength indication (RSSI). Typically, the mobility estimator 143 receives a RSSI relevant to the transmission received from the wireless client device 111 as input. In response, the mobility estimator 143 which may include a filter such as, but not limited to, a Kalman filter, returns estimates of at least one or more of the following parameters: the instant velocity of the wireless client device 111; the distance between the wireless client device 111 and the AP 130; the angle between the vector of movement (i.e. arrow 112) associated with the wireless client device 111 and the AP 130; and the coordinates of the wireless client device 111 in the coordinate system of the AP 130. The x and y coordinates of the wireless client device 111 are typically returned by the Kalman filter. Alternatively, the x-coordinate may be returned by the Kalman filter while the y-coordinate, corresponding to the distance between the AP 130 and the path 120 may already be known by or provided to the AP 130. Based on these estimated parameters, the mobility estimator 143 is further configured to determine the relative velocity between the wireless client device 111 and the AP 130. Alternatively, the processor 142 is configured to execute a relevant set of instructions stored in memory 144, which when executed return the relative velocity using the estimates provided by the mobility estimator 143. This is achieved using the following mathematical equations:

$$\cos\alpha \cong \frac{x_C}{D}$$

where: $x_C$ denotes the estimated x-coordinate of the wireless client device 111 within the coordinate system of the AP 130; and D is the estimated distance between the wireless client device 111 and the AP 130; and $$V_c = V \cdot \cos\alpha \cong V \cdot \frac{x_c}{D}$$

where: $V_C$ is the relative velocity; and V is the estimated instant velocity of the wireless client device 111.

Then, at step 320, the determined relative velocity is used to determine a channel coherence time. As explained above in relation to FIG. 1, the channel coherence time $T_c$ is inversely proportional to the maximum Doppler frequency spread. Therefore, the channel coherence time $T_c$ may be obtained using the relative velocity $V_c$ determined in step 310. The following table (Table 1) gives some examples of determined channel coherence times for different determined relative velocities:

TABLE 1

Aggregation Length Table

| Index $V_C/W$ (km/h) | Relative velocity $V_C$ (km/h) | Channel coherence time $T_C$ (microseconds) | Number of OFDM symbols |
|---|---|---|---|
| 1 | 10 | 18520 | 4629 |
| 2 | 20 | 9346 | 2336 |
| 3 | 30 | 6252 | 1562 |
| 4 | 40 | 4694 | 1173 |
| 5 | 50 | 3760 | 940 |
| 6 | 60 | 3126 | 781 |
| 7 | 70 | 2680 | 670 |
| 8 | 80 | 2348 | 587 |
| 9 | 90 | 2088 | 522 |
| 10 | 100 | 1880 | 470 |
| 11 | 110 | 1708 | 426 |
| 12 | 120 | 1564 | 391 |
| 13 | 130 | 1446 | 361 |
| 14 | 140 | 1344 | 335 |
| 15 | 150 | 1254 | 313 |
| 16 | 160 | 1174 | 293 |
| 17 | 170 | 1104 | 276 |
| 18 | 180 | 1044 | 261 |
| 19 | 190 | 990 | 247 |
| 20 | 200 | 940 | 235 |
| 21 | 210 | 894 | 223 |
| 22 | 220 | 854 | 213 |
| 23 | 230 | 816 | 204 |
| 24 | 240 | 784 | 196 |
| 25 | 250 | 752 | 188 |
| 26 | 260 | 724 | 180 |
| 27 | 270 | 696 | 174 |
| 28 | 280 | 672 | 168 |
| 29 | 290 | 648 | 162 |
| 30 | 300 | 628 | 156 |
| 31 | 310 | 608 | 151 |
| 32 | 320 | 588 | 147 |
| 33 | 330 | 570 | 142 |

At step 330, the maximum frame size of the PPDU in Orthogonal Frequency Division Multiplexing (OFDM) symbols may be determined. Determining the number of OFDM symbols per coherence time may be easily performed since the duration of each OFDM symbol is 4 microseconds. The results of this determination for each determined coherence channel time is illustrated in the last column of Table 1. Those skilled in the art will appreciate that step 330 may be performed in addition or alternatively to step 320.

The process then moves to step 340 in which the maximum A-MPDU frame size is determined for the channel coherence time $T_c$ determined in step 320 and/or for the maximum PPDU frame size determined in step 330. This determination is typically dependent on the MCS, the signal bandwidth (BW) and the number of spatial streams (NSS) used by the wireless client device 111 to communicate with the AP 130. The MCS typically defines the PPDU preamble length ($Pr_{len}$) and a constellation of other parameters including, but not limited to, the number of uncoded bits per OFDM symbols ($N_{DBPS}$). The preamble length further depends on the number of spatial streams that will be used for the next signal transmission. The following tables (Table 2 and Table 3), provided for illustration purposes only, shows these different parameters for each MCS for the 802.11n and 802.11ac wireless communication protocols:

TABLE 2

802.11n MCS parameters

| MCS | Preamble length $Pr_{len}$ (microseconds) | Number of uncoded bits per OFDM symbols $N_{DBPS}$ | |
|---|---|---|---|
| | | 20 MHz | 40 MHz |
| 0 | 36 | 26 | 54 |
| 1 | 36 | 52 | 108 |
| 2 | 36 | 78 | 162 |
| 3 | 36 | 104 | 216 |
| 4 | 36 | 156 | 324 |
| 5 | 36 | 208 | 432 |
| 6 | 36 | 234 | 486 |
| 7 | 36 | 260 | 540 |
| 8 | 40 | 52 | 108 |
| 9 | 40 | 104 | 216 |
| 10 | 40 | 156 | 324 |
| 11 | 40 | 208 | 432 |
| 12 | 40 | 312 | 648 |
| 13 | 40 | 416 | 864 |
| 14 | 40 | 468 | 972 |
| 15 | 40 | 520 | 1080 |
| 16 | 44 | 78 | 162 |
| 17 | 44 | 156 | 324 |
| 18 | 44 | 234 | 486 |
| 19 | 44 | 312 | 648 |
| 20 | 44 | 468 | 972 |
| 21 | 44 | 624 | 1296 |
| 22 | 44 | 702 | 1458 |
| 23 | 44 | 780 | 1620 |

TABLE 3

802.11ac MCS parameters

| MCS | Preamble length $Pr_{len}$ (microseconds) | Number of uncoded bits per OFDM symbols $N_{DBPS}$ | | |
|---|---|---|---|---|
| | | 20 Mz | 40 MHz | 80 MHz |
| 1 SS | | | | |
| 0 | 36 | 26 | 54 | 117 |
| 1 | 36 | 52 | 108 | 234 |
| 2 | 36 | 78 | 162 | 351 |
| 3 | 36 | 104 | 216 | 468 |
| 4 | 36 | 156 | 324 | 702 |
| 5 | 36 | 208 | 432 | 936 |
| 6 | 36 | 234 | 486 | 1053 |
| 7 | 36 | 260 | 540 | 1170 |
| 8 | 36 | 312 | 648 | 1404 |
| 9 | 36 | X | 720 | 1560 |
| 2 SSs | | | | |
| 0 | 40 | 52 | 108 | 234 |
| 1 | 40 | 104 | 216 | 468 |
| 2 | 40 | 156 | 324 | 702 |
| 3 | 40 | 208 | 432 | 936 |
| 4 | 40 | 312 | 648 | 1404 |
| 5 | 40 | 416 | 864 | 1872 |
| 6 | 40 | 468 | 972 | 2106 |
| 7 | 40 | 520 | 1080 | 2340 |
| 8 | 40 | 524 | 1296 | 2808 |
| 9 | 40 | X | 1440 | 3120 |

TABLE 3-continued 802.11ac MCS parameters

| MCS | Preamble length $Pr_{len}$ (microseconds) | Number of uncoded bits per OFDM symbols $N_{DBPS}$ | | |
|---|---|---|---|---|
| | | 20 Mz | 40 MHz | 80 MHz |
| | | 3 SSs | | |
| 0 | 44 | 78 | 162 | 351 |
| 1 | 44 | 156 | 324 | 702 |
| 2 | 44 | 234 | 486 | 1053 |
| 3 | 44 | 312 | 648 | 1404 |
| 4 | 44 | 468 | 972 | 2106 |
| 5 | 44 | 624 | 1296 | 2808 |
| 6 | 44 | 702 | 1458 | X |
| 7 | 44 | 780 | 1620 | 3510 |
| 8 | 44 | 936 | 1944 | 4212 |
| 9 | 44 | 1040 | 2160 | 4680 |

Determination of the maximum A-MPDU frame size (in octets) is therefore computed for a particular MCS, a signal bandwidth and a specific number of spatial streams using the following mathematical equations:

for long guard interval and using the channel coherence time $T_c$ determined in step 320:

$$L = \left[\frac{T_c - Pr_{len}}{LGI\_T_{OFDM}}\right] \cdot \frac{N_{DBPS}(BW, N_{SS})}{8}$$

for short guard interval and using the channel coherence time $T_c$ determined in step 320:

$$L = \left[\frac{T_c - Pr_{len}}{SGI\_T_{OFDM}}\right] \cdot \frac{N_{DBPS}(BW, N_{SS})}{8}$$

for long guard interval and using the maximum PPDU frame size determined in step 330:

$$L = \left[\frac{N_{OFDM} - Pr_{len,S}}{LGI\_T_{OFDM}}\right] \cdot \frac{N_{DBPS}(BW, N_{SS})}{8}$$

for short guard interval and using the maximum PPDU frame size determined in step 330:

$$L = \left[\frac{N_{OFDM} - Pr_{len,S}}{SGI\_T_{OFDM}}\right] \cdot \frac{N_{DBPS}(BW, N_{SS})}{8}$$

where:

$T_c$ denotes the channel coherence time in microseconds;
$Pr_{len}$ denotes the PHY preamble length in microseconds;
$Pr_{len,S}$ denotes the PHY preamble length in OFDM symbols;
$N_{OFDM}$ denotes the maximum PPDU frame size in OFDM symbols;
$N_{DBPS}(BW, N_{SS})$ denotes the number of uncoded data bit per OFDM symbol. This parameter is a function of the signal bandwidth, the number of spatial streams and further depends on the supported standard (e.g. 802.11n or 802.11 ac);
$LGI\_T_{OFDM}$ denotes the duration of the OFDM symbol including long guard interval (which is usually equals to 4 microseconds);
$SGI\_T_{OFDM}$ denotes the duration of the OFDM symbol including short guard interval (which is usually equals to 3.6 microseconds);
$N_{SS}$ denotes the number of spatial streams; and
BW denotes the signal bandwidth.

Finally, the process moves to step 350 where the controller 140 is configured to adjust the packet aggregation process for the next transmission according to the maximum A-MPDU frame size determined in step 340. Once done, the process goes back to step 310 thereby enabling a dynamic control and adjustment of the maximum A-MDPU frame size during communication between the wireless client device 111 and the AP 130.

Although FIG. 3 is described as a real time sequential process, the calculations for the channel coherence time and/or the maximum PPDU frame size may be performed in advance and stored in memory 144 in any suitable form. These calculations may be performed for a plurality of different relative velocities and signal characteristics. In this example embodiment of the present invention, step 310 remains unchanged and provides as output the determined relative velocity between the wireless client device 111 and the AP 130. Then, the determined relative velocity may be used as an initial entry index to retrieve the channel coherence time $T_c$ (step 320) and/or the maximum PPDU frame size (step 330) by table look-up. Subsequently, the maximum A-MPDU frame size may be computed for a particular MCS, signal bandwidth and number of spatial streams used by the mobile wireless client device 111 to communicate wirelessly with the AP 130. Finally, step 350 remains unchanged and the controller 140 is configured to adjust the packet aggregation process for the next transmission according to the maximum A-MPDU frame size retrieved in step 340. Once done, the process goes back to step 310 thereby enabling a dynamic control and adjustment of the maximum A-MDPU frame size during communication between the wireless client device 111 and the AP 130.

As explained above in relation to FIG. 1, the moving vehicle 110 may comprise a plurality of wireless client device 111. Therefore, the determination of the maximum A-MPDU frame size may be performed globally (i.e. for a WGB 111 serving a plurality of client devices 111) or individually (i.e. on a per wireless client device basis).

Although the above embodiments have been described in the context of the 802.11 communication protocol, those skilled in the art will realize that other implementations are possible.

It is appreciated that various features of the invention which are, for clarity, described in the contexts of separate embodiments may also be provided in combination in a single embodiment. Conversely, various features of the invention which, for brevity, are described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method implemented by an access point of a wireless communication system, the method comprising:
   determining an estimated relative velocity between a mobile wireless client device and said access point, said mobile wireless client device communicating wirelessly with said access point over a channel;

determining a channel coherence time for said channel using said estimated relative velocity;

determining a maximum aggregated frame size based on a maximum physical layer conversion protocol data unit in Orthogonal Frequency Division Multiplexed (OFDM) symbols determined according to the channel coherence time, a physical layer preamble length in OFDM symbols, a duration of an OFDM symbol, and a number of uncoded data bits per OFDM symbol; and dynamically aggregating packets that are to be transmitted to the mobile wireless client device based on the maximum aggregated frame size.

2. The method of claim 1, wherein determining the channel coherence time includes:

determining a Doppler frequency shift associated with a transmission between the mobile wireless client device and the access point based on the estimated relative velocity; and computing the channel coherence time based on the Doppler frequency shift.

3. The method of claim 1, wherein said determining an estimate for a relative velocity is based at least on a received signal strength indication received from said mobile wireless client device.

4. The method of claim 3, further comprising:

providing estimates of parameters relevant to said mobile wireless client device using said received signal strength indication, said parameters comprising: an instant velocity of said mobile wireless client device; an angle between said mobile wireless client device and said access point; a distance between said mobile wireless client device and said access point; and a position of said mobile wireless client device relative to said access point; and determining an estimate of a relative velocity between said mobile wireless client device and said access point using said estimates.

5. The method of claim 1, wherein determining the maximum aggregated frame size is based on said channel coherence time for a particular modulation and coding scheme, channel bandwidth and number of spatial streams used by said mobile wireless client device to communicate wirelessly with said access point.

6. The method of claim 5, wherein determining the maximum aggregated frame size comprises determining a maximum aggregate medium access control protocol data unit for a short guard interval using said channel coherence time.

7. The method of claim 5, wherein determining the maximum aggregated frame size comprises determining a maximum aggregate medium access control protocol data unit for a long guard interval using said channel coherence time.

8. The method of claim 5, further comprising:

determining a maximum physical layer conversion protocol data unit frame size using said channel coherence time; and determining a maximum aggregate medium access control protocol data unit for a short guard interval using said maximum physical layer conversion protocol data unit frame size.

9. The method of claim 1, wherein determining the maximum aggregated frame size includes:

computing a difference between the maximum physical layer conversion protocol data unit in OFDM symbols and the physical layer preamble length in OFDM symbols;

dividing the difference by the duration of the OFDM symbol to produce an intermediate product; and multiplying the intermediate product by the number of uncoded data bits per OFDM symbol.

10. The method of claim 9, wherein the physical layer preamble length is a function of transmission bandwidth of a transmission sent by the mobile wireless client device, number of spatial streams transmitted by the mobile wireless client device in the transmission and modulation and coding scheme used for the transmission.

11. The method of claim 10, wherein the number of uncoded data bits per OFDM symbol is a function of transmission bandwidth of the transmission sent by the mobile wireless client device, number of spatial streams transmitted by the mobile wireless client device in the transmission and modulation and coding scheme used for the transmission.

12. An access point controller comprising:

a processor, said processor being operable to:

determine an estimate relative velocity between a mobile wireless client device and an access point, said mobile wireless client device communicating wirelessly with said access point over a channel;

determine a channel coherence time for said channel using said estimated relative velocity;

determine a maximum aggregated frame size based on a maximum physical layer conversion protocol data unit in Orthogonal Frequency Division Multiplexed (OFDM) symbols determined according to the channel coherence time, a physical layer preamble length in OFDM symbols, a duration of an OFDM symbol, and a number of uncoded data bits per OFDM symbol; and dynamically aggregate packets that are to be transmitted to the mobile wireless client device based on the maximum aggregate frame size.

13. The access point controller of claim 12, wherein the processor is configured to determine the channel coherence time by:

determining a Doppler frequency shift associated with a transmission between the mobile wireless client device and the access point based on the estimated relative velocity; and computing the channel coherence time based on the Doppler frequency shift.

14. The access point controller of claim 12, wherein said processor executes a Kalman filler configured to provide estimates of parameters relevant to said mobile wireless client device using a received signal strength indication, said parameters comprising: an instant velocity of said mobile wireless client device; a distance between said mobile wireless client device and said access point; an angle between said mobile wireless client device and said access point; and a position of said mobile wireless client device relative to said access point.

15. The access point controller of claim 14, wherein the processor is configured determine the maximum aggregate frame size by:

computing a difference between the maximum physical layer conversion protocol data unit in OFDM symbols and the physical layer preamble length in OFDM symbols;

dividing the difference by the duration of the OFDM symbol to produce an intermediate product; and multiplying the intermediate product by the number of uncoded data bits per OFDM symbol.

16. The access point controller of claim 15, wherein the physical layer preamble length is a function of transmission bandwidth of a transmission sent by the mobile wireless client device, number of spatial streams transmitted by the mobile wireless client device in the transmission and modulation and coding scheme used for the transmission, and wherein the number of uncoded data bits per OFDM symbol is a function of transmission bandwidth of the transmission sent by the mobile wireless client device, number of spatial streams transmitted by the mobile wireless client device in the transmission and modulation and coding scheme used for the transmission.

17. One or more non-transitory computer readable storage media encoded with software comprising computer executable instructions and when the software is executed operable to:
  determine an estimated relative velocity between a mobile wireless client device and an access point, said mobile wireless client device communicating wirelessly with said access point over a channel;
  determine a channel coherence time for said channel using said estimated relative velocity;
  determine a maximum aggregated frame size based on a maximum physical layer conversion protocol data unit in Orthogonal Frequency Division Multiplexed (OFDM) symbols determined according to the channel coherence time, a physical layer preamble length in OFDM symbols, a duration of an OFDM symbol, and a number of uncoded data bits per OFDM symbol; and
  dynamically aggregate packets that are to be transmitted to the mobile wireless client device based on the maximum aggregate frame size.

18. The one or more non-transitory computer readable storage media of claim 17, wherein the instructions operable to determine the maximum aggregated frame size include instructions operable to:
  compute a difference between the maximum physical layer conversion protocol data unit in OFDM symbols and the physical layer preamble length in OFDM symbols;
  divide the difference by the duration of the OFDM symbol to produce an intermediate product; and
  multiply the intermediate product by the number of uncoded data bits per OFDM symbol.

19. The one or more non-transitory computer readable storage media of claim 18, wherein the physical layer preamble length is a function of transmission bandwidth of a transmission sent by the mobile wireless client device, number of spatial streams transmitted by the mobile wireless client device in the transmission and modulation and coding scheme used for the transmission, and wherein the number of uncoded data bits per OFDM symbol is a function of transmission bandwidth of the transmission sent by the mobile wireless client device, number of spatial streams transmitted by the mobile wireless client device in the transmission and modulation and coding scheme used for the transmission.

20. The one or more non-transitory computer readable storage media of claim 17, wherein the estimated relative velocity is equal to V multiplied by $\cos \alpha$, wherein V is an estimated instantaneous velocity of the mobile wireless client device, and wherein $\alpha$ is an angle between a vector of the estimated instantaneous velocity of the mobile wireless client device and the access point.

\* \* \* \* \*